(12) United States Patent
Schmidmer et al.

(10) Patent No.: US 9,037,435 B2
(45) Date of Patent: May 19, 2015

(54) DEVICE AND METHOD FOR DETERMINING A SAMPLE RATE DIFFERENCE

(75) Inventors: Christian Schmidmer, Nuremberg (DE); Roland Bitto, Nuremberg (DE); Michael Keyhl, Heroldsbach (DE)

(73) Assignee: OPTICOM DIPL.-ING. MICHAEL KEYHL GMBH, Erlangen (DE)

( * ) Notice: Subject to any disclaimer, the term of this patent is extended or adjusted under 35 U.S.C. 154(b) by 544 days.

(21) Appl. No.: 13/334,968

(22) Filed: Dec. 22, 2011

(65) Prior Publication Data

US 2012/0166139 A1 Jun. 28, 2012

Related U.S. Application Data

(63) Continuation of application No. PCT/EP2010/056095, filed on May 5, 2010.

(30) Foreign Application Priority Data

Jun. 24, 2009 (DE) .......... 10 2009 030 318

(51) Int. Cl.
*G06F 17/18* (2006.01)
*H04N 17/00* (2006.01)
*G06K 9/32* (2006.01)
*G06T 7/00* (2006.01)

(52) U.S. Cl.
CPC ........... *H04N 17/004* (2013.01); *G06K 9/32* (2013.01); *G06T 7/001* (2013.01); *G06T 2207/30148* (2013.01); *G06T 7/0026* (2013.01)

(58) Field of Classification Search
CPC .................................................. H04N 17/004
USPC ......... 702/180; 342/16, 18, 159, 132, 357.31; 348/184, 515, 512, 466, 608, E17.001
See application file for complete search history.

(56) References Cited

U.S. PATENT DOCUMENTS

| | | | |
|---|---|---|---|
| 3,798,357 A | * | 3/1974 | Narahara ................. 386/307 |
| 5,543,853 A | * | 8/1996 | Haskell et al. ......... 375/240.28 |
| 6,480,234 B1 | * | 11/2002 | Sasaki et al. .................. 348/512 |

(Continued)

FOREIGN PATENT DOCUMENTS

| | | |
|---|---|---|
| EP | 1918909 | 5/2008 |
| JP | 2005-033314 | 2/2005 |
| JP | 2008116954 | 5/2008 |
| WO | 0131638 A1 | 5/2001 |

OTHER PUBLICATIONS

Rix, , "Perceptual Evaluation of Speech Quality (PESQ) The New ITU Standard for Emd-To-End Speech Quality Assessment Part 1—Time-Delay Compensation", Journal of the Audio Engineering Society, Audio Engineering Society, New York, NY, US, Bd. 50, Nr. 10, Oct. 1, 2002, XP001245917, ISSN: 1549-4950, 755-764.

(Continued)

*Primary Examiner* — Carol S Tsai
(74) *Attorney, Agent, or Firm* — Michael A. Glenn; Perkins Coie LLP

(57) ABSTRACT

In embodiments, a device is illustrated for determining a sample rate difference between a first information signal and a second information signal including an offset determiner for determining for each of a plurality of segments of the first information signal, associated offset values which temporally align the plurality of segments with respect to the second information signal and a calculator for calculating the sample rate difference on the basis of the offset values.

13 Claims, 6 Drawing Sheets

(56) References Cited

U.S. PATENT DOCUMENTS

| | | | | |
|---|---|---|---|---|
| 6,639,541 | B1 * | 10/2003 | Quintana et al. | 342/18 |
| 7,295,247 | B2 * | 11/2007 | Bang | 348/515 |
| 7,403,153 | B2 * | 7/2008 | Kelly et al. | 342/159 |
| 7,649,963 | B2 * | 1/2010 | Choi et al. | 375/340 |
| 7,809,346 | B2 * | 10/2010 | Risbo et al. | 455/296 |
| 8,369,537 | B2 * | 2/2013 | Bieber et al. | 381/98 |
| 8,635,211 | B2 * | 1/2014 | Jiang et al. | 707/723 |
| 2006/0044391 | A1 * | 3/2006 | Mauger et al. | 348/184 |
| 2006/0247810 | A1 * | 11/2006 | Risbo et al. | 700/94 |

OTHER PUBLICATIONS

Schmidmer, Christian, P.862 / PESQ Implementations must Indicate Invalid Results if Time Alignment fails; D 112, Opticom Germany; ITU-T Draft Study Period 2001-2004, International Telecommunication Union, Geneva; CH, Bd. Study Group 12, Jan. 27, 2003, XP017416067, 1-2.

* cited by examiner

A)

B)

|  | offset values | difference offset values | normalized DVW |
|---|---|---|---|
| VW(1) | 101 N=1 |  |  |
| VW(2) | 103 ⎫ | DVW(1) 2 | NDVW(1) 2 |
| VW(3) | 103 ⎬ | DVW(2) 0 | NDVW(2) 1/4 |
| VW(4) | 103 ⎬ N=4 | DVW(3) 0 | NDVW(3) 1/4 |
| VW(5) | 103 ⎭ | DVW(4) 0 | NDVW(4) 1/4 |
| VW(6) | 102 N=1 | DVW(5) 1 | NDVW(5) 1/4 |
| VW(7) | 101 N=1 | DVW(6) 1 | NDVW(6) 1 |

C)

DEVICE AND METHOD FOR DETERMINING A SAMPLE RATE DIFFERENCE

CROSS-REFERENCE TO RELATED APPLICATIONS

This application is a continuation of copending International Application No. PCT/EP2010/056095, filed May 5, 2010, which is incorporated herein by reference in its entirety, and additionally claims priority from German Application No. 102009030318.9, filed Jun. 24, 2009, which is incorporated herein by reference in its entirety.

BACKGROUND OF THE INVENTION

The present invention relates to a device and a method for determining a sample rate difference between two information signals, like e.g. between an interfered information signal and a non-interfered information signal. The device and the method for determining a sample rate difference may for example be used for improving of so-called objective measurements for the quality assessment of signals.

In applications like e.g. voice, audio and video quality measurements, there is frequently the necessity to exactly temporally align a non-interfered reference signal and an interfered test signal portion by portion. Methods which achieve this temporal alignment with a high precision are possible. For assessing the quality of encoded audio and video signals by measurement technology, today standardized perceptional measurements are used. Such a known standardized method is, for example, the so-called PESQ method (PESQ=Perceptual Evaluation of Speech Quality, PESQ (ITU-T Rec.P862)) for a correct assessment of voice or speech quality in an aurally accurate way. A frequent problem is, however, that the sample rates/frame rates of the used signals do not exactly match, as they were possibly substantially changed by the used transmission method partially on purpose, partially by tolerances. In this case, only a short section of the temporally aligned signals really matches.

With an increasing length of the portions or sections, the differences between the signals increase with respect to the sample rates/frame rates. Known quality measurement methods assess these differences as a strong interference, although a person would hardly perceive the differences. In order to correctly assess the interferences and thus to be able to execute an objective and good quality measurement, it may be necessitated to correct the sample rates before the temporal alignment of the signals. The difficulty here is, however, to determine the ratio of the sample rates of the two signals.

In known methods, this is achieved by detecting shifts of spectral components of the signals. Such a method is, for example, disclosed in patent document EP 19 189 09 A1. This method, however, necessitates very large window lengths of the signals to be examined which may, for example, be in a range of seconds in order to achieve a sufficient accuracy. Further, such a method which is based on detecting shifts of spectral components may only be applied very restrictedly, as transmission systems today usually insert additional temporal and spectral interferences into the signal. If such interferences occur during the method in an analysis window, the result is often unusable. With typical measurement sequences of a duration of for example 10 s, as they are used for example for voice quality measurement methods, thus no sufficient data is available for a reliable assessment of the sample rate or the sample rate difference. For calculating the sample rate difference, conventional methods may use the Fourier transformation.

SUMMARY

According to an embodiment, a device for determining a sample rate difference between a first information signal and a second information signal may have: an offset determination means to determine, for each of a plurality of segments of the first information signal, associated offset values which temporally align the plurality of segments to the second information signal; a means for calculating the sample rate difference on the basis of the offset values, wherein the means for calculating the sample rate difference is implemented to execute a statistical evaluation with the help of a regression analysis by means of the offset values, or wherein the means for calculating the sample rate difference is implemented to execute a statistical evaluation with the help of determining a central tendency of differences between offset values or a histogram analysis by means of the differences.

According to another embodiment, a method of determining a sample rate difference between a first information signal and a second information signal may have the steps of: determining associated offset values for each of a plurality of segments of the first information signal which temporally align the plurality of segments with respect to the second information signal; and calculating the sample rate difference on the basis of the offset values, wherein the calculation of the sample rate difference on the basis of the offset values comprises a statistical evaluation with the help of a regression analysis by means of the offset values, or a statistical evaluation with the help of determining a central tendency of differences between the offset values or a histogram analysis by means of the differences.

Another embodiment may have a computer program comprising a program code for executing the inventive method.

The present invention is based on the finding that a device for determining a sample rate difference between two information signals may be provided which allows to reliably determine a sample rate difference also for very short signals having a small sample rate difference by determining the sample rate difference on the basis of offset values between the two information signals.

It is one advantage of the present invention that the device and the method for determining a sample rate difference are very robust, for example, against spectral interferences and function reliably even with very short signals or short analysis windows and small deviations of the sample/frame rates. By the use of offset values of associated segments and a statistic evaluation of a distribution of these offset values, for example, outliers in the distribution may easily be removed. A spectral division or decomposition and a comparison of the information signals based on the spectral decomposition is not absolutely necessitated. The inventive device may use a plurality frames which are short as compared to a spectral analysis so that this way a relatively high number of measurement points is available.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
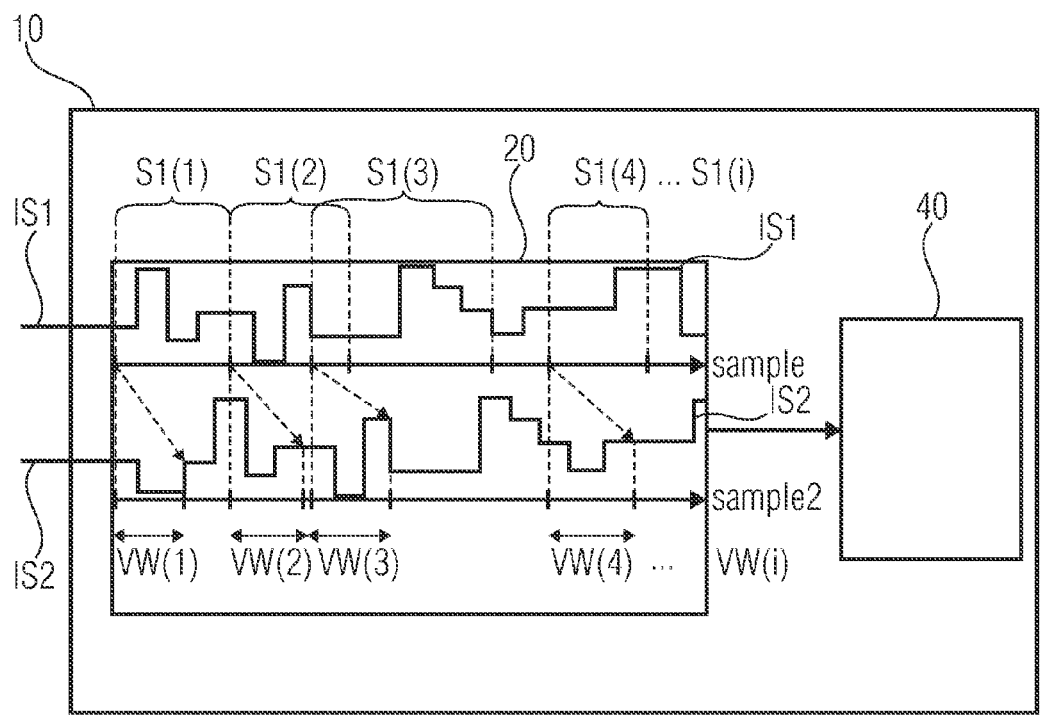
FIG. 1a shows a schematical illustration of a device for determining a sample rate difference between a first information signal and a second information signal according to one embodiment of the present invention.

With reference to the following description it ought to be noted that in the different embodiments like or seemingly like functional elements comprise the same reference numerals and thus the description of those functional elements is mutually interchangeable in the different embodiments illustrated in the following.

It should further be noted that in the following the meaning of the first information signal IS1 and the second information signal IS2 is mutually interchangeable.

FIG. 1a shows a device 10 for determining a sample rate difference between a first information signal IS1 and a second information signal 1S2 according to one embodiment of the present invention. The device 10 for determining a sample rate difference comprises an offset determination means 20 which determines, for each of a plurality of segments S1 (i) of segments of the first information signal IS1, associated offset values VW(i), aligning the plurality of segments S1(i) temporally with respect to the second information signal IS2. Further, the device 10 comprises a means 40 for calculating the sample rate difference on the basis of the offset values VW(i).

The first information signal IS1 and the second information signal IS2 may, for example, be audio signals or also video signals and digital or analog information signals. Both information signals represent the same content, but for different reasons the information signals may differ, like for example with respect to spatial resolution, regarding color of the videos, regarding bit depth and not least with respect to the sample rate.

The information signals IS1 and IS2 were each sampled using a certain sample rate or at least comprise a respective sample rate. In case of audio signals the same, for example, comprise one audio sampling value per sampling time. In case of video signals the same, for example, comprises a frame or an image per sampling time.

Due to inaccuracies of a transmission method or a transmission network, due to transcoding or code conversion or the like the information signals may comprise sample rate differences. For example, a matching content in the first information signal IS1 and the second information signal IS2 then has a different length due to the sample rate difference. With short sections, this sample rate difference may only cause slight deviations, but with longer sections the differences between the signals increase and may occur as strong interferences.

The first information signal IS1 and the second information signal IS2 may be supplied to the offset determination means 20. The offset determination means is now implemented to divide the first information signal IS1 into a plurality of segments S1(i).

Each segment S1(i) may comprise a number of subsequent sampling times. For example, a segment of the first information signal IS1, if it is an audio signal, may comprise a number of $A1 \leq 256$ sampling points, and if it is a video signal, a number of $A2 \leq 50$, for example 10, subsequent sampling times.

The information signals IS1 and IS2 are arranged schematically in FIG. 1 on a respectively associated sampling time axis (Abtw, Abtw2). Each segment S1(i) may now comprise specific features or information portions of the first information signal IS1. Further, each of these segments may comprise a different number of subsequent sampling times or a different number of frames. The segments S1(i) may, for example, comprise the same temporal length, the same number of sampling times or the same number of frames, as schematically illustrated in FIG. 1a at segments S1(1) and S1(2). The segments may also comprise different time lengths, like e.g. S1(3), or a different number of sampling times or frames than other segments of the first information signal IS1.

For example, a segment of an audio signal may comprise 1,024 sampling values or samples, wherein these 1,024 samples may be combined into 256 averaged energy density values, using which subsequently a cross correlation for a temporal alignment of the first audio signal IS1 and the second audio signal IS2 may be executed. Thus, a so-called subsampling may be executed.

As it is schematically illustrated in FIG. 1a, the individual segments may also overlap, like, for example, segment S1(2) and segment S1(3). The plurality of segments S1(i) may also comprise "gaps", like it is for example the case between segment S1(3) and S1(4). I.e., the first information signal IS1 may be completely separated into a plurality of segments by the offset determination means 20 or may be divided only partially or a portion after portion into a plurality of segments. These segments S1(i) may comprise gaps or overlaps, and may comprise different time periods or a different number of samples or other values for determining an offset.

The plurality of segments S1(i) may for example be associated with the second information signal IS2 for example based on an identical or comparable feature of an information unit with the help of the offset determination means 20. The offset determination means 20 is now implemented to determine the offset values VW(i) which temporally align the plurality of segments with respect to the second information signal IS2. In the present, strongly simplified case (FIG. 1a) an allocation of the segments to the second information signal is executed for example based on an identical or similar signal shape. This allocation of the segments S1(i) to the second information signal may be executed by the offset determination means, for example with the help of a cross correlation. The allocation may here, for example, be executed based on identical or similar frames or images with video signals or also by identical or similar information signal shapes or based on other features like, for example, averaged energy values of a signal, brightness values, color values, etc.

The second information signal IS2 may now comprise a different sample rate with respect to the first information signal IS1 and may thus also comprise a different relative sampling time axis (Abzp2). I.e., the corresponding reference axs with respect to the first information signal IS1 and IS2 may be differently scaled axes.

Thus, for example, an offset value VW(1) may be associated with the segment S1(1) one by the offset determination means 20, an offset value VW(2) to the segment S1(2), an offset value VW(3) to the segment S1(3), an offset value S4 to the segment S1(4), etc. The offset values VW(i) may for example correspond to certain time periods or ranges, a certain number of sampling times or also a certain number of frames. To one sequence of segments S1(1 to i) a corresponding sequence of offset values VW (1 to i) is associated, on the basis of which means 40 may determine a sample rate difference between the first information signal IS1 and the second information signal IS2. The offset values VW(i) are for this purpose supplied to the means (40) for calculating the sample rate difference.

In some embodiments, the first information signal and the second information signal may be similar or identical signals, wherein at least one of the information signals was transmitted via a communication channel. One of the two information signals IS1, IS2, may also be a non-interfered reference signal and the other information signal may be the respective information signal interfered with or degraded after a transmission via a (tele)communications connection or via a transmission network. One of the information signals IS1, IS2 may for example be a signal to be tested which is, for example, the output signal of a (tele)communications system or network or generally an element to be examined. The other one of the information signals IS1, IS2 may be an original or also a reference signal which is generally supplied as an input signal into a transmission element or communication channel to be examined, respectively, or transmission test system, etc. and which is to be compared to the output signal after the transmission. Apart from the temporal alignment of the information signals and a corresponding allocation of the features or signal shapes, by the determination of a sample rate difference, with the help of the inventive device 10, an improved or more objective comparison may be given by the adaptation of the sample rate which may change based on the transmission path of the information signals. Such a sample rate difference between the information signals IS1, IS2 may, for example result due to different clocks on the input side and on the output side or also due to the transmission method used and the corresponding software, partially on purpose, partially due to tolerances.

Figure 1B:
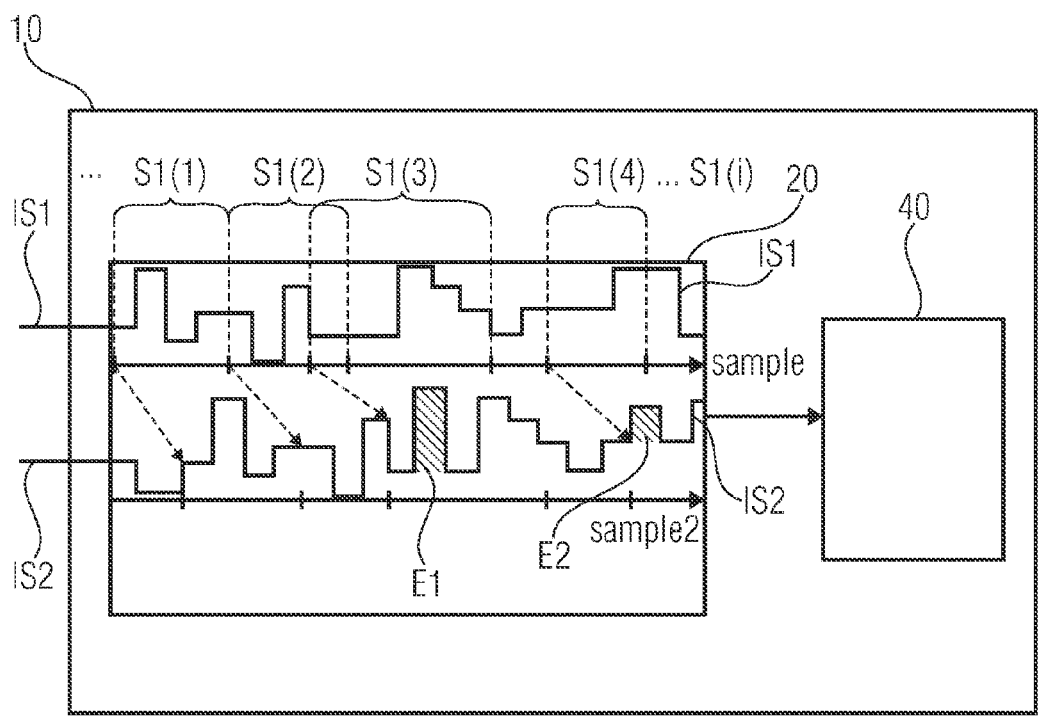
FIG. 1b shows a schematical illustration of a device for determining a sample rate difference between a first information signal and a second interfered information signal according to a further embodiment of the present invention.

As illustrated schematically in FIG. 1b, an interfered second information signal IS2 may be an output signal of an interference test system or a telecommunications system which is to be compared to the first information signal IS1—the input signal—with respect to the transmission quality. In FIG. 1b, the information signal IS2 for example comprises two errors E1, E2 with respect to the first information signal IS1. These errors E1, E2 may, for example have resulted from an interfered transmission.

According to embodiments, the device 10 for determining a sample rate difference between a first information signal IS1 and a second interfered information signal IS2 may comprise an offset determination means 20. This offset determination means 20 may determine offset values VW(i) which temporally align the plurality of segments S1(i) of the first information signal IS1 to the second interfered information signal IS2. The thus determined offset values may then be supplied to the means 40 for calculating the sample rate difference on the basis of the offset values VW(i). The same may then determine a sample rate difference. The sample rate difference determined by means 40 may be an averaged sample rate difference. From the sample rate difference, then also the sample rate ratio between the first and the second information signal may be determined.

In embodiments of the present invention, the means 40 for calculating a sample rate difference may be implemented to determine differences between the offset values VW(i) associated with different segments S1(i) of the first information signal IS1 in order to obtain differential offset values DVW(i). The means 40 for calculating the sample rate difference may now further be implemented so that the calculation of the sample rate difference is executed on the basis of the differential offset values DVW(i). The differential offset values may thus for example be the difference or the absolute difference between subsequent offset values. In other words, for example, the differential or difference offset value DVW(i) may be equal to VW(i+1)−VW(i) or also the absolute value |VW(i+1)−VW(i)|.

In embodiments of the present invention, the means 40 for calculating the sample rate difference may be implemented to determine or to calculate the sample rate difference between the first information signal IS1 and the second information signal IS2 by statistic evaluation of a distribution which depends on the offset values VW(i). The offset values which may, for example, correspond to a number of sampling times or samples may comprise different values which are then statistically evaluated with the help of the means for calculating the sample rate difference and thus a sample rate difference may be determined.

Figure 2:
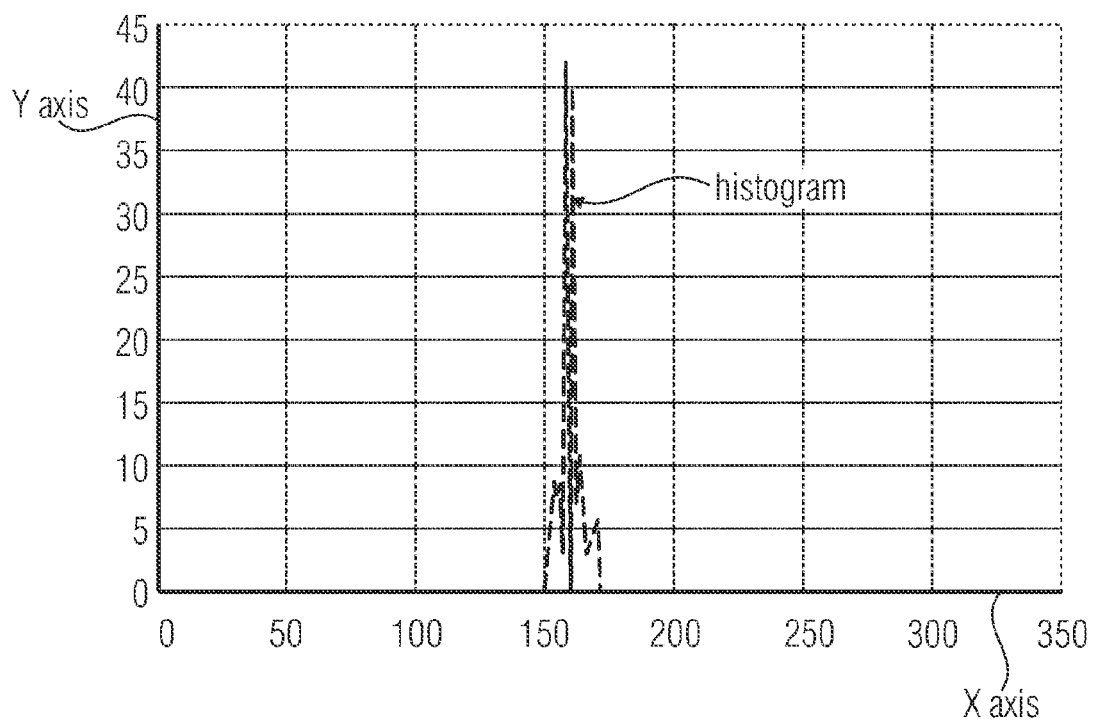
FIG. 2 shows a diagram for determining a sample rate difference with the help of a histogram analysis according to a further embodiment of the present invention.

According to some embodiments, this statistical evaluation may be executed with the help of a histogram analysis. In this respect, for example the offset values VW(i) or also the differential offset values DVW(i) may be divided, ordered and plotted in a histogram or in a histogram type way, i.e. in intervals or classes. The statistical evaluation may be executed with the help of a computer program having a program code which executes the method for determining a sample rate difference. In particular, the invention is thus also based on a computer program or computer program product executing the method for determining a sample rate difference to be described in more detail later. The offset values VW(i) or the differential offset values DVW(i) may, as illustrated in FIG. 2, be plotted in a histogram. On the X-axis of the histogram offset values VW(i) are plotted. The offset values VW(i) may here, for example, be frames. In other embodiments, on the x-axis, for example also the differential offset values, sampling times or other information units for sample rate difference determination may be plotted.

As it is usually the case with histograms, the respective value range may be divided into different classes or intervals with a predetermined interval width. The same do not necessarily have the same width. Across each class or each interval a rectangle is set up whose area is proportional to the class-specific frequency of the measurement value. In the present case this means that on the y-axis of the histogram the frequency of the respective offset value is plotted.

The means 40 for calculating the sample rate difference may thus execute a statistical evaluation of a distribution on the basis of the offset values determined by the offset determination means. Thus, for example, the frequency distribution of the offset values VW(i) or also the differential offset values DVW(i) determined by the offset determination means 20 may be used for calculating the sample rate difference between the first information signal IS1 and IS2. As illustrated in FIG. 2, with the histogram there a statistical tendency results, e.g. an average value (center) of approximately 160 frames with a standard deviation (StdDev) of 3.77 and a reliability of 94.444%.

The means 40 for calculating the sample rate difference by a statistical evaluation of a distribution which depends on the offset values VW(i) may, for example, also be implemented so that outliers or very coarse deviations or errors of a value of the distribution are removed from the distribution or are not considered in the further evaluation.

From the histogram now, for example with the help of a probability density function (PDF) a central tendency, e.g. a median or a mean or average value of the histogram may be determined. This median or average value may correspond to the determined sample rate difference. The histogram may further be a normalized histogram.

Figure 3:
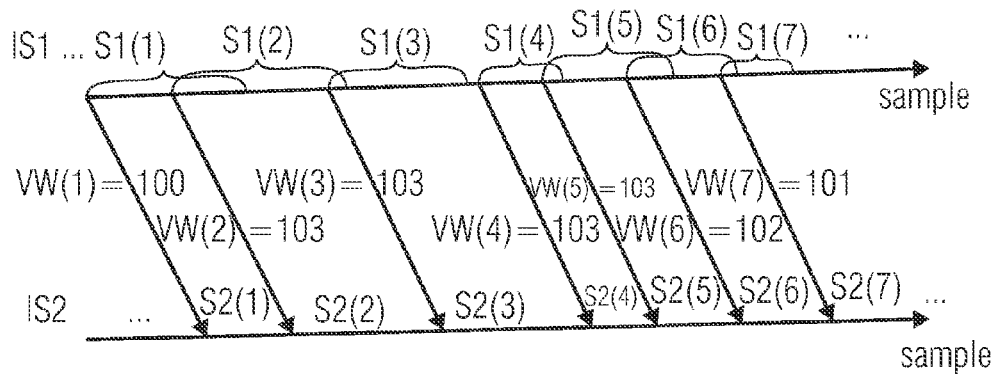
FIG. 3 shows the schematical illustration for determining a sample rate difference on the basis of offset values with the help of a histogram analysis.
Figure 3:
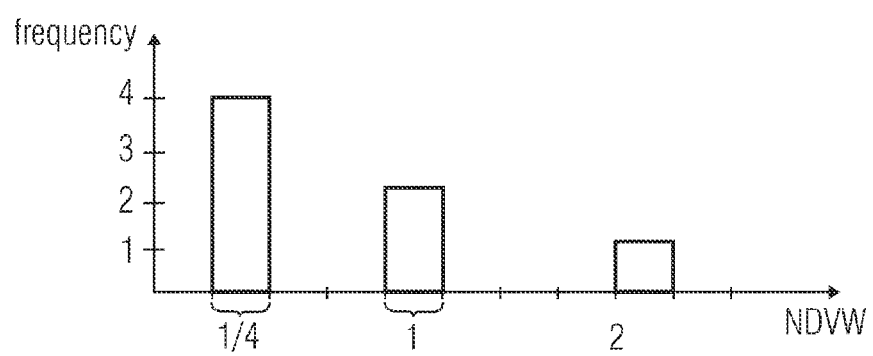

In FIG. 3 now in a very simplified form an embodiment regarding the method for determining a sample rate difference between a first information signal IS1 and a second information signal 1S2 is schematically illustrated. In FIG. 3, section A, the first information signal IS1 is symbolically arranged on an axis of sample values. The information signal IS1 may again be divided into a series of segments S1(1) to S1(7) by the offset determination means. The second information signal IS2 is also symbolically arranged on a second axis of sample values, wherein the axis scalings of the two axes may be different. I.e., the first information signal IS1 has a sample value axis independent of the sample value axis of the second information signal. The individual segments S1(1) to S1(7) are then associated with the second information signal IS2 and corresponding signal points or segments S2(1) to S2(7) on the second sampling values axes by the offset determination means. The offset determination means 20 now determines for each of the plurality of segments S1(1) to S1(7) of the first information signal IS1 an associated offset value VW(1) to VW(7) aligning the plurality of segments S1(1) to S1(7) temporally or regarding the sampling values with the second information signal and the corresponding information signal points or segments S2(1) to S2(7).

In the present embodiment, now for example the segment S1(1) of the first information signal IS1 comprises a relative offset value VW(1) of 101 sample values. The second segment S1(2) has a relative offset value VW(2) of 103 sample values with respect to the information signal IS2 and the corresponding information segment S2(2). For the third segment S1(3) a value VW(3) of 103 with respect to S2(3) results, for the fourth offset value VW(4) of the segment S1(4) also a value of 103 results with respect to the second information signal segment S2(4). The segment S1(5) comprises an offset value VW(5) of 103 sample values with respect to the corresponding segment S2(5), the segment S1(6) comprises an offset value VW(6) of 102 sample values with respect to S2(6) and the segment S1(7) for example has an offset value VW(7) of 102 sample values with respect to the corresponding information signal segment S2(7) of a second information signal IS2. According to some embodiments, the offset determination means may be implemented to determine the relative offset values between the segment S1(i) and the corresponding information signal points or segments S2(i).

As it is schematically illustrated in FIG. 3, section B, these offset values may be entered into a table. The means 40 for calculating the sample rate difference on the basis of the offset values may be implemented to enter the offset values and the corresponding determined numeral values into a table or list. In a first column, for example, the offset values are plotted with the correspondingly determined numeral values, i.e., for example, VW(1)=101 and VW(2)=103, etc. The means 40 for calculating the sample rate difference is optionally further implemented to calculate the differential offset values DVW(i) already mentioned above from the corresponding offset values VW (i).

For example, as a first differential offset value DVW(1) from the difference between the second offset value VW(2) and the first offset value VW (1) the value 2 results. I.e., the shift of the first information signal to the second information signal not only comprises a constant portion, but between the segments different offset values may be present due to the sample rate difference. If certain sections of the information signals IS1 and IS2 only comprise a constant temporal offset, then a constant offset value results, as it is for example the case with the offset values VW(2) to VW(5) which comprise a constant offset value of 103 offset values and comprise corresponding differential offset values DVW(2) to DVW (4)=0.

The means 40 for calculating the sample rate difference may according to some embodiments be implemented to allocate a sequence of N (for N≥2) subsequent identical offset values VW(i), a sequence of N subsequent identical normalized differential offset values NDVM(i) associated with the offset values. These normalized differential offset values NDVM(i) may correspond to the quotient of the differential offset value with respect to the N+1-th offset value VW(N+1) and the N-th offset value VW(N) and the number N. Thus, for a sequence of N associated normalized offset values the following applies NDVW=((VW(N+1)−VW(N))/N).

In the simplified example in FIG. 3, thus for the N=4 subsequent identical offset values VW(2) to VW(5), for N=4 correspondingly subsequent normalized differential offset values NDVW(2) to NDVW(5) associated with the offset values, a value of ¼ results. This value results, as described above, from the quotient of the differential offset value with respect to the N+1-th offset value, i.e. here VW(6), and the N-the offset value, here VW(5). This value corresponds to the differential offset value DVW(5)=1 which is then divided by the number N=4 of subsequent identical offset values. From this, for a sequence of N=4 subsequent identical normalized differential offset values NDVW(2) to NDVW(5) each a value of ¼ results. I.e., a differential offset value leap is equally distributed across the preceding constant differential offset values.

In another embodiment, the means 40 for calculating the sample rate difference is implemented to distribute an offset value leap equally across the preceding constant offset values. Thus, for example, the offset value VW(6)=102 is distributed to the preceding constant offset values VW(2) to VW(5)=103, so that to each of these offset values a value of 102.8 is allocated.

As it is illustrated in FIG. 3, section C, now for example the normalized differential offset values NDVW(i) may be plotted in the form of a histogram. On the x-axis of the histogram, in this embodiment the normalized differential offset values are plotted. The differential offset values are here plotted in intervals or in classes with an interval width of ¼. On the y-axis, the frequency of the corresponding value is plotted. In the present example, thus for the normalized differential offset value ¼ a bar is plotted up to a height of 4 and the normalized differential offset values NDVW(1) and NDVW (6) are entered accordingly. As already mentioned above, the means 40 for calculating the sample rate difference may be implemented to remove outliers in the distribution values, like for example the value NDVW(1)=2, and not consider the same in an evaluation of the histogram.

From the frequency distribution, by the means 40 for calculating the sample rate difference, for example a central tendency may be determined and a corresponding average differential offset value or delay leap may be determined for each sample value (delay difference per sample). In this respect, for example with the help of a probability density function (PDF), from a histogram or a frequency distribution the most frequently occurring mean or average delay leap per sample value may be read out. If this value comprises a sufficient frequency, this value may serve as a reliable measure for the deviation of the sample rate/or frame rate. In order to acquire a relatively high number of offset values or measurement points, the first information signal IS1 may be divided into very short temporal portions or segments or frames. The temporal duration of those segments may for example be smaller 5 s, i.e. e.g. smaller 1 s or even smaller 0.1 s.

Figure 4:
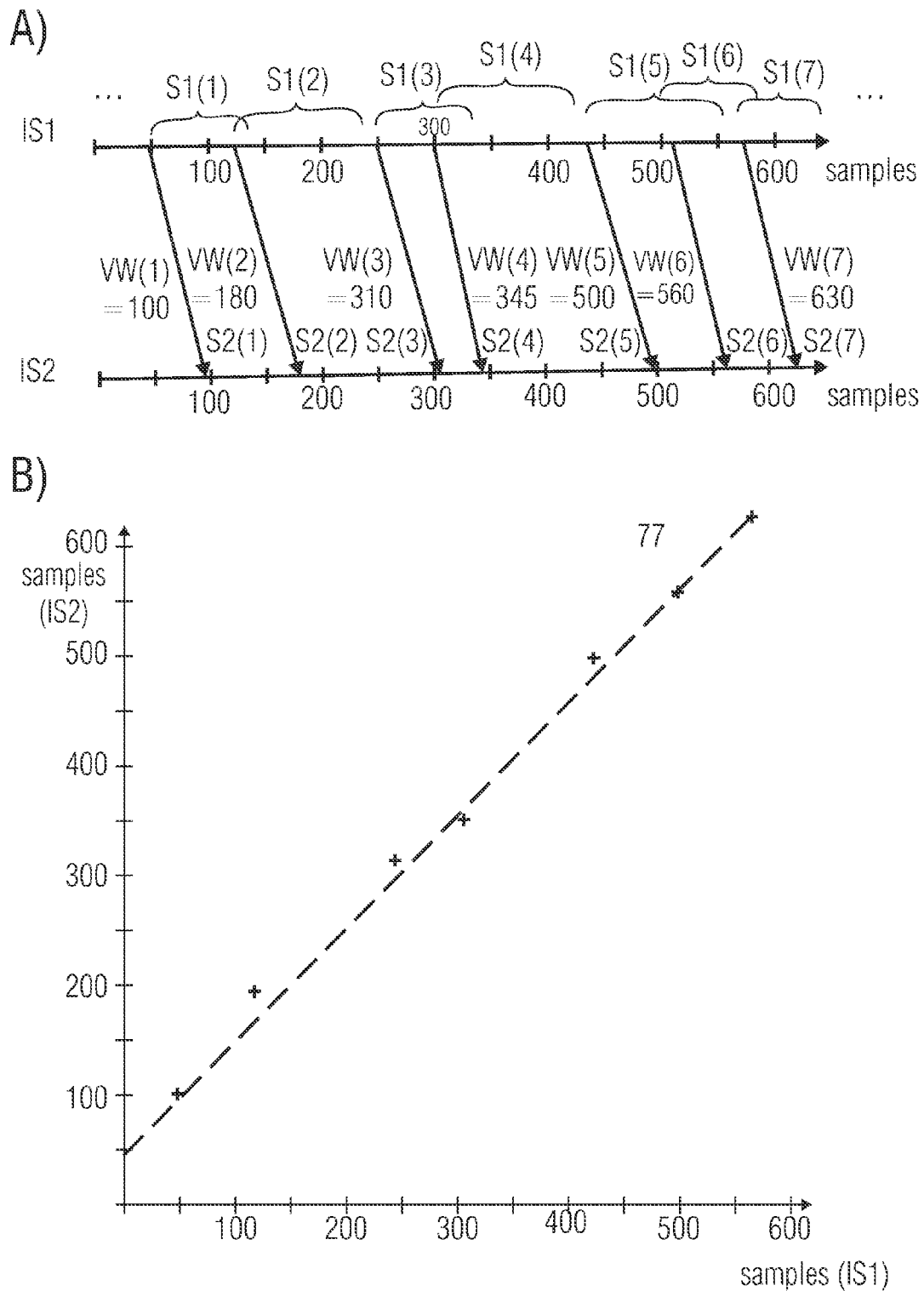
FIG. 4 shows a schematical illustration for determining a sample rate difference on the basis of offset values with the help of a regression analysis.

In FIG. 4, a further embodiment of the method for determining a sample rate difference is illustrated schematically. In section A, the first information signal IS1 and the second information signal IS2 are again illustrated on respective sample value axes. The first information signal IS1 is divided into segments S1(1) to S1(7) by the offset determination means 20. Analog to that, as it is described in connection with FIG. 3, those segments again comprise corresponding offset values VW(1) to VW(7) with respect to the corresponding locations or segments S2(1) to S2(7) of the second information signal (IS2). These offset values VW(i) are determined by the offset determination means 20. The offset values VW(1) to VW(7) temporally align the segments S1(1) to S1(7) with respect to the second information signal 152. In the embodiment of FIG. 4, the offset values are absolute offset values in contrast to the embodiment of FIG. 3. The segment S1(1) thus comprises an absolute offset value VW(1) of 100 samples with respect to the information signal IS2. Analog to that, for the corresponding segments S1(i) the following absolute offset values result: VW(2)=180, VW(3)=310, VW(4)=345, VW(5)=500, VW(6)=560 and VW(7)=630. A means 40 for calculating the sample rate difference on the basis of the offset values may now according to this embodiment be implemented to execute a statistical evaluation of this distribution with the help of a regression analysis. As it is illustrated schematically in FIG. 4, section B, in this respect the absolute offset values VW(1) to VW(7) may be plotted in a diagram over the associated sample values of the segments S1(i) of the first information signal. From the resulting regression line 77, then from the line pitch m a sample rate difference and from the intersection t with the Y-axis an average absolute offset value may be calculated by the means 40 for calculating a sample rate difference.

Figure 5A:
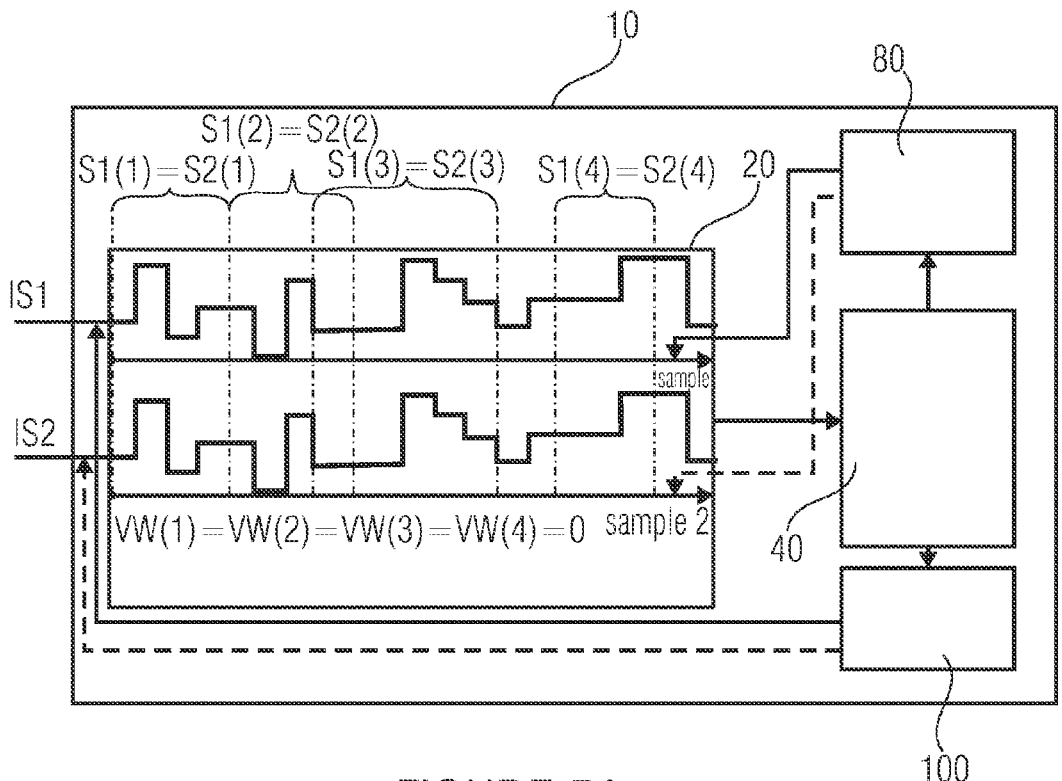
FIG. 5a shows a schematical illustration of a device for determining a sample rate difference with a sample rate changing means and optionally a means for temporally aligning the first and second information signal according to a further embodiment of the present invention.

In FIG. 5a, a schematical illustration of a further embodiment for a device 10 for determining a sample rate difference between a first information signal IS1 and a second information signal IS2 is illustrated. In this embodiment, the device 10 for determining a sample rate difference further comprises a sample rate changing means 80 which is implemented to execute a reduction of a deviation of the sample rates of the first IS1 and the second IS2 information signal if the sample rate difference is greater than a predetermined threshold value. The sample rate changing means 80 may thus, based on the sample rate difference determined by the means 40 for calculating the sample rate difference between the first information signal and the second information signal execute a reduction of this deviation of the sample rates, i.e. an approximation or alignment of the sample rates between the first and the second information signals. In this respect, the sample rate changing means 18 for example be implemented to change the sample rate of the first information signal or the second information signal or also of both information signals IS1, IS2, so that a sample rate difference between the two information signals decreases. In this respect, the sample rate changing means may execute a sample rate conversion. The sample rate changing means 80 may be implemented so that the sample rates of the first information signal and the second information signal are completely approximated. The sample rate changing means may execute a reduction depending on a predetermined threshold value with respect to the sample rate difference between the first information signal and the second information signal. For example, this threshold value may be defined so that no sample rate difference, i.e. only a sample rate difference of zero, is tolerated between the first information signal and the second information signal. The predetermined threshold value may, however, for example also lie between one sample per frame and ten samples per frame or segment. In other embodiments of the present invention, this predetermined threshold value may also be defined differently.

As it is schematically illustrated in FIG. 5a, the device 10 for determining a sample rate difference may further comprise a means 100 for a temporal alignment of the first information signal IS1 and the second information signal IS2 with respect to each other. The means 100 for a temporal alignment of the first information signal IS1 and the second information signal IS2 may be implemented to generate a second respectively arranged state of the information signals IS1 and IS2 by the temporal alignment. This second respectively arranged state may correspond to a second respective temporally aligned or arranged state. In this respect, the means 100 may be implemented to align the first information signal IS1 to the second signal IS2 or also the second information signal IS2 to the first information signal IS1. It is of course also possible that the first information signal IS1 and the second information signal IS2 are mutually temporally aligned with respect to each other. As it is schematically illustrated in FIG. 5a, then the segments S1(1) to S1(4) in the idealized case are exactly aligned to the corresponding information segments or information points S2(1) to S2(4). The means 100 for the temporal alignment of the first information signal and the second information signal may further be implemented so that this temporal alignment is executed after the reduction of the deviation of the sample rate difference between the first and the second information signal to generate a second temporally aligned state between the first information signal IS1 and the second information signal. In the ideal case, the sample rate difference may be completely balanced, i.e. no sample rate difference exists anymore, so that then the offset values VW(1) to VW(4) comprise the value of zero. I.e., there is no offset and no sample rate difference between the segments of the first information signal S1(i) and the segments S2(i) of the second information signal.

According to some embodiments, the sample rate changing means 80 may be implemented to iteratively execute the reduction of the deviation of the sample rates until a termination criterion is fulfilled. In this respect, for example the means 40 for determining the sample rate difference may also be implanted in order to iteratively execute a calculation or determination of the sample rate difference on the basis of the offset values and to supply these iteratively calculated sample rate difference values to the sample rate changing means 80, whereupon the same may execute an iterative reduction of the deviation of the sample rates until the termination criterion is fulfilled. The termination criterion may, for example, be the above-mentioned threshold value, a temporal value, a value given by a computer power on which the inventive method is executed or a setting given by an operator of the inventive device.

Figure 5B:
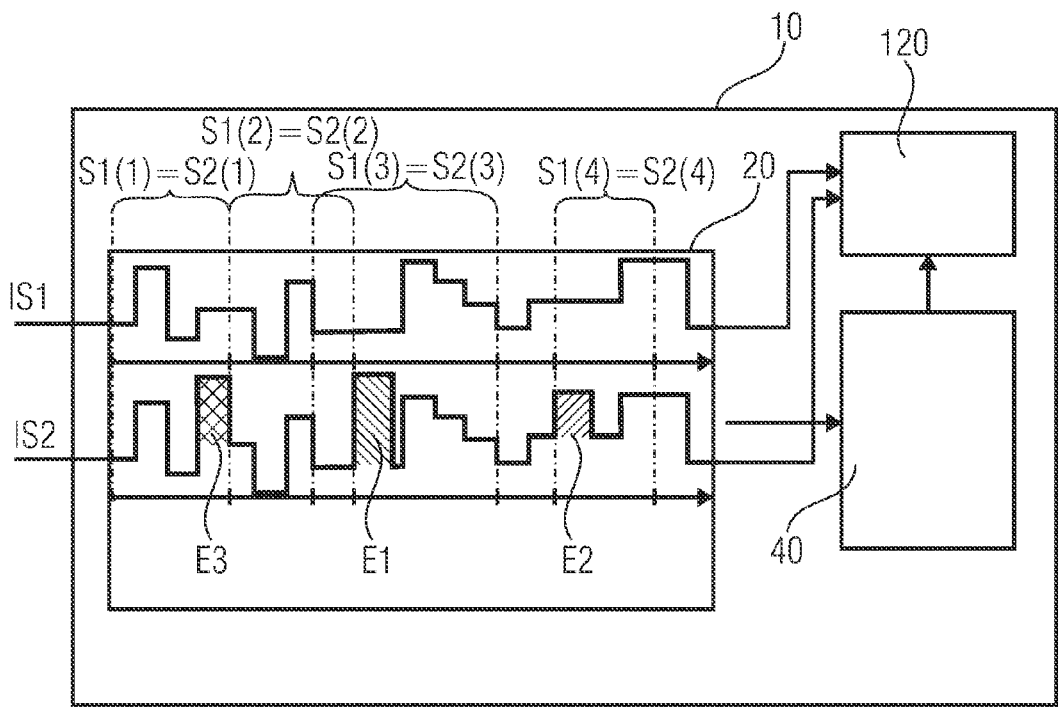
FIG. 5b shows a schematical illustration of a device for determining a sample rate difference with a quality determination means according to a further embodiment of the present invention.

The device 10 for determining the sample rate difference between the first information signal IS1 and a second information signal IS2 may, as schematically illustrated in FIG. 5b, further comprise a quality determination means 120 which is implemented to determine an information quality difference between the first information signal IS1 and the second information signal IS2. The quality determination means 120 may be implemented to determine the information quality difference between the first information signal and the second information signal in a second respectively arranged state for example by the means 100 for a temporal alignment. Further, the quality determination means 120 may be implemented to determine an information quality difference between the first and the second information signal in the second respectively arranged state, i.e. after the reduction of the deviation of the sample rate difference.

In FIG. 5b, the first information signal IS1 and the second information signal IS2 are both temporally aligned (temporal alignment) and also the sample rates are aligned by a sample rate changing means 80 up to a predetermined threshold value. These two information signals IS1, IS2 are now supplied to the quality determination means 120, so that an objective information quality difference between the first information signal and the second information signal may be determined with the help of the quality determination means. The quality determination means may, for example, compare a first input information signal IS1 into a network, e.g. into a telecommunication network or generally into a transmission network, to an output information signal IS2 after the transmission through this network. If, for example, the transmitted information signal IS2 comprises errors E1, E2, as schematically illustrated in FIG. 5b, as compared to the original information signal IS1, this objective information quality difference may be determined or quantified by the quality determination means. In this determination, the first information signal IS1 and the second information signal IS2 may be present in the second respectively aligned or temporally aligned state. This alignment with respect to the temporal arrangement may be executed by the above-described means 100 for a temporal alignment of the information signals and the reduction of the deviation of a sample rate between the two information signals IS1 and IS2 may be executed by the sample rate changing means 80. By the quality determination means 120 then, for example, also the information quality transmission difference between different networks or transmission systems or telecommunication channels using which the information or the information signals are transmitted may be determined. If, for example, the same original information signal IS1 comprises additional interferences in the transmission through a different network or a changed network, like e.g. a further error E3, then from the determination of the information quality difference between the second information signal with the interferences E1, E2 and the transmission with the errors E1, E2 and E3 a "degraded" transmission quality of the other or changed network may be concluded. This of course is an extremely simplified description for illustrating the quality measurement.

The present invention represents a robust method for detecting, calculating or determining sample rate differences between a first information signal and a second information signal. The inventive device and the method may still reliably work for very short signals or for very short segments and also with slight deviations of the sample/frame rates. The device and the method may, of course, also be used for longer or long segments and with greater deviations of the sample rates.

Figure 6:
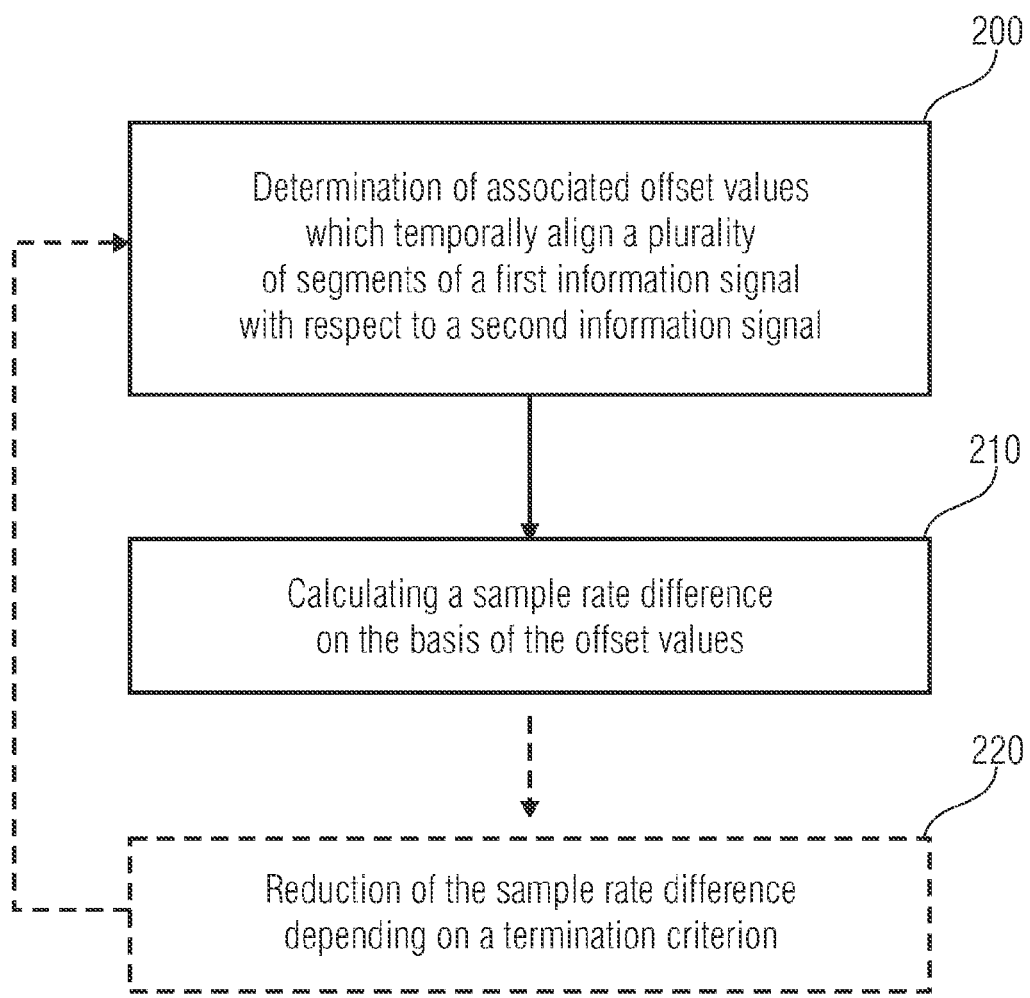
FIG. 6 shows a flowchart for the method for determining a sample rate difference between a first information signal and a second information signal according to an embodiment of the present invention.

In FIG. 6 a flowchart regarding the method for determining a sample rate difference between a first information signal IS1 and a second information signal IS2 according to an embodiment of the present invention is illustrated. The method comprises a step of determining 200 associated offset values for each of a plurality of segments of the first information signal IS1 which temporally align the plurality of segments with respect to the second information signal IS2 and further a step of calculating or determining 210 the sample rate difference on the basis of these offset values. Depending on the size of the sample rate difference and a corresponding termination criterion, the method may also comprise a reduction 220 of the sample rate difference and an iterative execution of steps 200, 210 up to reaching the termination criterion.

According to one embodiment, first of all the signals IS1, IS2 are divided into very short temporal sections (frames or segments). These frames are then associated to each other. The temporal sections (segments or frames) may be far shorter than analysis windows which are necessitated to draw conclusions to a sample rate difference from a shift of spectral components of the information signals. Due to the very short analysis windows the reliability of the delay measurement or the offset value measurement may be affected, but in turn within one frame smaller deviations result due to possible sample rate differences. Additionally, this way a relatively high number of measurement points (offset values) are available for the subsequent method steps. A high number of measurement points may be substantial for a successful application of statistical methods.

According to some embodiments regarding the method for determining a sample rate difference, now for each frame or each segment the delay difference or the differential offset value with respect to its predecessor segment or predecessor frame is entered in a table. This may, for example, be executed electronically with the help of a computer program with a corresponding program code. Each delay leap may now, according to some embodiments, be normalized by the number of previous frames with a constant delay or offset value. From this table, in a next step a histogram is set up with the frequency of each occurring normalized delay leap. Here, according to some embodiments, delay leaps or differential offset values with a difference of zero (at the end of a series of delay leaps) or extremely high values (outliers) may be removed from the plurality or the distribution of the determined values and not be considered in the further evaluation. Using methods of histogram analysis, very coarse errors of the histogram may be corrected. With the help of the probability density function (PDF), the most frequently occurring mean delay leap per sample, the so-called delay difference per sample, may be gained from the histogram. If this value comprises a sufficient frequency, this value may serve as a reliable measure for the deviation of the sample rate or frame rate, i.e. the sample rate difference.

According to some embodiments, based on the sample rate difference also the sample rate ratio of the first information signal IS1 and the second information signal IS2 may be determined. The sample rate ratio may be described by the following formula.

$$\text{Sample Rate Ratio} = 1.0/(1.0 - \text{Delay Difference per Sample}).$$

In general, the inventive method and the inventive device may be applied to all signal pairs for which a delay or offset value may be calculated.

Although some of FIGS. 1a to 5b are illustrated as block diagrams for embodiments of the present invention for determining a sample rate difference between a first information signal and a second information signal, these figures simultaneously also serve for illustrating some embodiments of the method for determining a sample rate difference between the first information signal and the second information signal. The functionalities of the blocks described with respect to the figures may correspondingly be implemented as steps of the inventive method.

It is in particular noted that depending on the circumstances, the method may also be implemented as software or as a computer program. The implementation may for example be on a digital storage medium, in particular a floppy disc, a CD or a DVD having electronically readable control signals which may cooperate with a programmable computer system so that a corresponding method is executed. In general, the invention thus also consists in a computer program product having a program code stored on a machine readable carrier for executing the method, when the computer program is executed on a computer. In other words, the invention may thus be realized as a computer program having a program code for executing the method, when the computer program product is executed on a computer.

A typical application of the present invention is thus, for example, a new kind of voice quality measurement method. This voice quality measurement method may be executed similar to the above-mentioned PESQ, but comprise an improved temporal alignment. According to embodiments of the present invention, the method for determining a sample rate difference between a first information signal IS1 and a second information signal IS2 may first of all comprise a temporal alignment or adaption of the signals IS1, IS2. From the subsequently measured delays or offset values, a sample rate difference is measured or determined. If needed, i.e. if the measured sample rate difference is greater than a predetermined threshold value, the sample rate may be adapted by means of sample rate conversion of the information signals with respect to each other and then the temporal alignment may be executed again. In sample rate conversion, a sample rate of a digital information signal may be converted from one sample rate to another sample rate, while the information contained in the information signal is changed as little as possible. This principle may be repeated iteratively until the sample rate deviation is small enough, i.e. for example smaller than a predetermined threshold value. If the information signals in this second temporally aligned state comprise a reduced sample rate difference, a quality measurement, i.e. for example a voice quality measurement may be executed. This objective voice quality measurement method may provide more exact or objective voice quality measurement results as compared to conventional voice quality measurement methods, as here apart from the already know temporal alignment a sample rate difference between the signals to be examined may be reduced.

The inventive method and the inventive device for determining a sample rate difference here comprise the advantage that they still reliably function for very short signals and with small deviations of the sample/frame rates.

A further possible application is to again correct the pitch of an audio signal which may also deviate due to the deviating sample rate. Thus, a so-called pitch correction may be executed.

According to one embodiment of the present invention, the quality determination means 120 may also determine an information quality difference of the first and second information signals which are in the second temporally aligned state with the help of a cross-correlation.

If the information signals are, for example, a video sequence or video signals, a segment may for example correspond to one or several images of the video signal. If the first and second information signals IS1, IS2 are audio signals (e.g. music or voice signals), a segment may for example comprise a certain number of samples of the digitized audio stream.

The embodiments which were described above were more or less based on the fact that the sample rate difference is global or constant for example across the first and/or the second information signal. This assumption does not necessarily have to be fulfilled. Depending on a transmission path on which one of the information signals was transmitted, it may for example be the case that the sample rate difference to the respective other information signal, like e.g. a reference signal, temporally fluctuates. The above embodiments may easily be expanded insofar as they not only detect a constant or global sample difference but that they detect a temporal course of the sample rate difference. One possibility is, for example, that the embodiments described above are locally applied to predetermined temporal sections of the first or second information signal in order to determine, for each of these predetermined temporal sections, assuming that within the same the sample rate difference is constant again, the sample rate difference individually. The predetermined temporal sections may be given by a uniform temporal division or by another criterion and they may overlap, not overlap, be adjacent to each other or even be spaced apart from each other. A concrete example is described in the next paragraph. It would also be possible to detect a continuous change of the sample rate difference by fitting a corresponding sample rate difference function over time into the temporal sequence of offset values which have been determined for the plurality of segments of the first information signal, like e.g. a polynomial of higher order instead of a regression line 77.

One example for determining the sample rate difference considering that the same may vary temporally is to detect pauses in the first information signal, like e.g. in a telephone voice signal, i.e. temporal sections in which the participants do not speak which exceed a certain time period and across which the signal level does not exceed a certain threshold. There are many different possibilities for detecting pauses. The remaining temporal sections separated by the detected pauses may then individually, one after the other, be supplied to the above-mentioned embodiments for determining the sample rate difference, to determine for each voice section a sample rate difference. Or it is only determined in a pre-analysis whether the offset values determined in the individual segments performed differently in the different temporal voice sections, although only in the latter case the temporal voice sections are treated separately. Of course, the above-described method may also be applied to other signals apart from voice signals. The definition of the pauses may also be different to the one mentioned above.

Again, in other words, above-mentioned embodiments may be expanded in different ways so that a detection of a temporally varying sample rate difference is possible. According to one variation, first of all by an analysis of the individual offset values at the individual segments it is determined whether the same perform differently in predetermined different signal sections, wherein depending on that the sections are treated separately or not. According to a further variation, temporal sections are determined by the fact that they contain voice or speech, whereas pauses separating the same are ignored. The pauses may be detected in any way. The temporal sections separated by pauses are then individually supplied to the above-mentioned embodiments for sample rate difference determination.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A device for determining a sample rate difference between a first information signal and a second information signal, comprising:
    an offset determiner to determine, for each of a plurality of segments of the first information signal, associated offset values which temporally align the plurality of segments to the second information signal;
    a calculator for calculating the sample rate difference on the basis of the offset values, wherein the calculator for calculating the sample rate difference is implemented to execute a statistical evaluation with the help of a regression analysis by means of the offset values, or wherein the calculator for calculating the sample rate difference is implemented to execute a statistical evaluation with the help of determining a central tendency of differences between offset values or a histogram analysis by means of the differences.

2. The device according to claim 1, wherein the calculator for calculating the sample rate difference is implemented to calculate the sample rate difference by statistical evaluation of a distribution which depends on the offset values.

3. The device according to claim 2, wherein the calculator for calculating the sample rate difference is implemented to execute the statistical evaluation of the distribution so that outliers in the distribution are removed.

4. The device according to claim 1, wherein the calculator for calculating the sample rate difference is implemented to determine differences between offset values associated with different segments of the first information signal in order to acquire differential offset values, wherein the calculator for calculating the sample rate difference is implemented to execute the calculation of the sample rate difference on the basis of the differential offset values.

5. The device according to claim 3, wherein the calculator for calculating the sample rate difference is implemented to allocate to a sequence of N (N≥2) subsequent identical offset values a sequence of N subsequent identical normalized differential offset values which corresponds to the quotient of the differential offset value with respect to the N+1-th offset value VW(N+1) and the N-th offset value VW(N), divided by the number N, i.e. VW(N+1)−VW(N)/N.

6. The device according to claim 1, wherein the first and the second information signals are audio signals or the first and the second information signals are video signals.

7. The device according to claim 1, wherein one segment of the first information signal comprises a number A1≤256 of subsequent sample times of the first information signal if the first information signal is an audio signal, or a number A2≤50 of subsequent sample times of the first information signal if the first information signal is a video signal.

8. The device for determining a sample rate difference between a first information signal and a second information signal according to claim 1, and a sample rate changer which is implemented to execute a reduction of a deviation of the sample rates of the first and second information signals if the sample rate difference is greater than a predetermined threshold value.

9. The device according to claim 8, further comprising a unit for a temporal alignment of the first information signal and the second information signal with respect to each other, that is after a reduction of the deviation of the sample rate difference of the first and the second information signal in order to generate a second respectively temporally aligned state.

10. The device according to claim 9, further comprising a quality determiner which is implemented to determine an information quality difference between the first information signal and the second information signal in the second respectively temporally aligned state.

11. The device according to claim 8, wherein the sample rate changer is implemented to execute the determination of the sample rate difference and the reduction of the deviation iteratively until a termination criterion is fulfilled.

12. A method of determining a sample rate difference between a first information signal and a second information signal, comprising:
    determining, performed by an offset determiner, associated offset values for each of a plurality of segments of the first information signal which temporally align the plurality of segments with respect to the second information signal; and
    calculating, performed by a calculator, the sample rate difference on the basis of the offset values,
    wherein the calculation of the sample rate difference on the basis of the offset values comprises a statistical evaluation with the help of a regression analysis by means of the offset values, or a statistical evaluation with the help of determining a central tendency of differences between the offset values or a histogram analysis by means of the differences,
    wherein at least one of the calculator and the offset determiner comprises a hardware implementation.

13. A computer-readable medium having stored thereon a computer program comprising a program code for executing a method of determining a sample rate difference between a first information signal and a second information signal, the method comprising:
    determining associated offset values for each of a plurality of segments of the first information signal which temporally align the plurality of segments with respect to the second information signal; and
    calculating the sample rate difference on the basis of the offset values,
    wherein the calculation of the sample rate difference on the basis of the offset values comprises a statistical evaluation with the help of a regression analysis by means of the offset values, or a statistical evaluation with the help of determining a central tendency of differences between the offset values or a histogram analysis by means of the differences.

* * * * *